(12) United States Patent
Poyneer et al.

(10) Patent No.: US 8,995,787 B2
(45) Date of Patent: Mar. 31, 2015

(54) MEASUREMENT OF WAVE-FRONT ABERRATION IN A SMALL TELESCOPE REMOTE IMAGING SYSTEM USING SCENE-BASED WAVE-FRONT SENSING

(71) Applicant: Lawrence Livermore National Security, LLC, Livermore, CA (US)

(72) Inventors: Lisa A Poyneer, Livermore, CA (US); Brian J Bauman, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 65 days.

(21) Appl. No.: 13/828,963

(22) Filed: Mar. 14, 2013

(65) Prior Publication Data

US 2014/0270565 A1  Sep. 18, 2014

(51) Int. Cl.
*G06K 9/36* (2006.01)
*G06T 5/00* (2006.01)
(52) U.S. Cl.
CPC ...................... *G06T 5/003* (2013.01)
USPC ............ 382/280; 382/260; 382/299; 382/312
(58) Field of Classification Search
USPC ................. 382/260, 181, 280, 278, 299, 312; 356/326, 303, 305, 300; 348/294; 341/122, 155, 120, 137; 359/558
See application file for complete search history.

(56) References Cited

U.S. PATENT DOCUMENTS 7,283,231 B2 * 10/2007 Brady et al. .................. 356/326
7,483,569 B2 *  1/2009 Bhagavatula et al. ........ 382/181

OTHER PUBLICATIONS

Poyneer, "Scene-Based Shack-Hartman Wave-Front Sensing: Analysis and Simulation," Applied Optics, vol. 42, No. 29, pp. 5807-5815, (2003).
Poyneer et al., "Scene-Based Wave-Front Sensing for Remote Imaging," Proc. of SPIE, vol. 5162, pp. 91-102, (2003).

* cited by examiner

*Primary Examiner* — Anh Do
(74) *Attorney, Agent, or Firm* — John P. Woolridge

(57) ABSTRACT

Reference-free compensated imaging makes an estimation of the Fourier phase of a series of images of a target. The Fourier magnitude of the series of images is obtained by dividing the power spectral density of the series of images by an estimate of the power spectral density of atmospheric turbulence from a series of scene based wave front sensor (SBWFS) measurements of the target. A high-resolution image of the target is recovered from the Fourier phase and the Fourier magnitude.

12 Claims, 13 Drawing Sheets

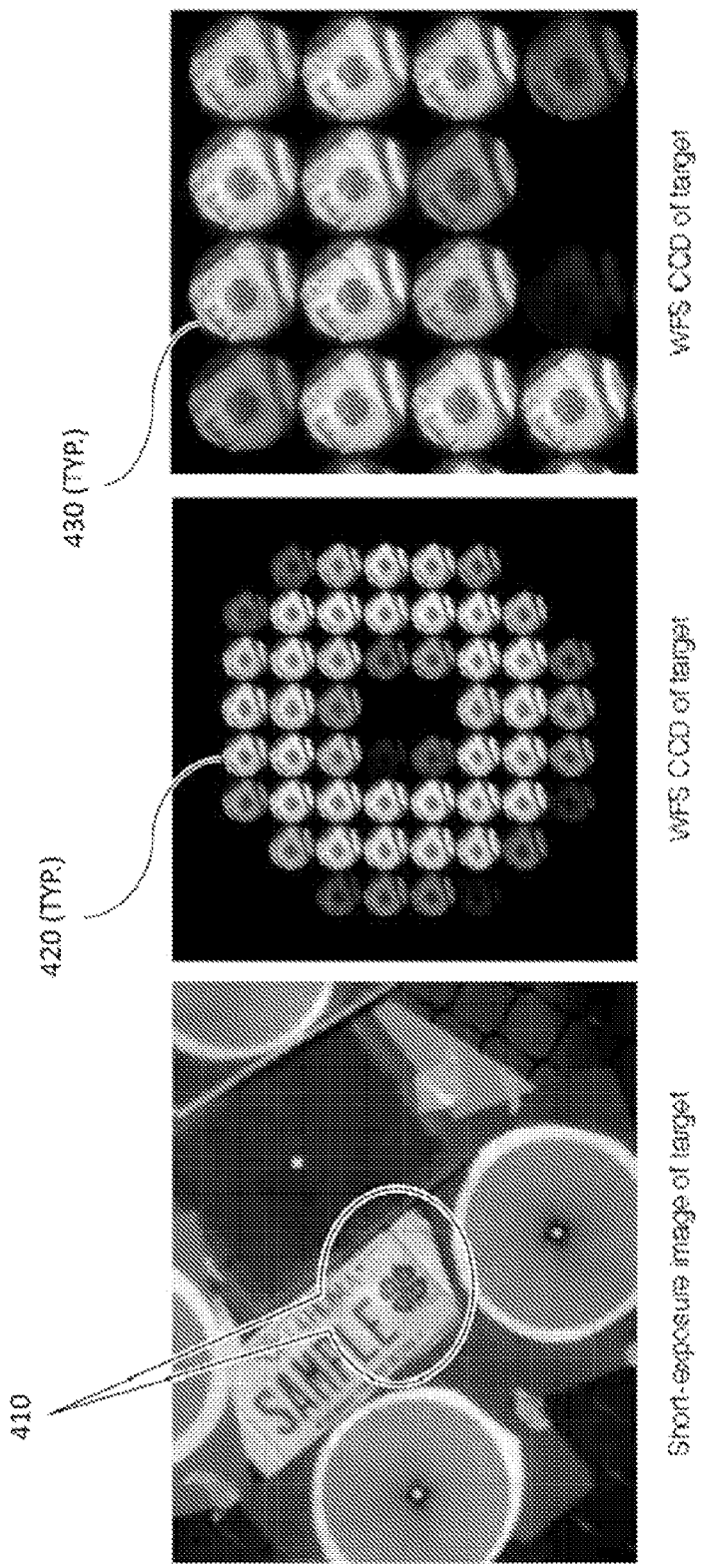

MEASUREMENT OF WAVE-FRONT ABERRATION IN A SMALL TELESCOPE REMOTE IMAGING SYSTEM USING SCENE-BASED WAVE-FRONT SENSING

STATEMENT REGARDING FEDERALLY SPONSORED RESEARCH OR DEVELOPMENT

The United States Government has rights in this invention pursuant to Contract No. DE-AC52-07NA27344 between the US. Department of Energy and Lawrence Livermore National Security, LLC, for the operation of Lawrence Livermore National Laboratory.

BACKGROUND OF THE INVENTION

1. Field of the Invention

The present invention relates to adaptive optics, and more specifically, it relates to a reference-free compensated imaging system for recovering a high resolution image of a target.

2. Description of Related Art

The basic elements of a typical (prior art) adaptive optics system 100 are shown in FIG. 1. The goal of such systems is to provide real-time compensation for propagation errors, as encountered by optical beams, as they travel through dynamic distorting paths, including turbulent atmospheres, optical pointing errors, imperfect optical elements, multi-mode optical fibers, etc.

By compensating for optical wavefront distortions, one can enhance the performance of a variety of optical systems. Examples include optical communication systems, remote sensors, precision laser-beam delivery systems for industrial and medical purposes, and compensated imaging systems such as in medical applications (ophthalmological imaging and precision surgical procedures through the eye) and microscopy. In the latter example, this implies that one can view complex objects over a distorted path with the same image quality as if the path were distortion-free. In this case, the performance of the imaging system can approach that of its theoretical diffraction limit, within the so-called isoplanatic cone.

In what follows, we first discuss a generic adaptive optical system capable of correcting for path distortions encountered by a so-called reference beam. The reference beam is typically an image-free optical source, whose function is to sample the path distortions and, thus, provide this wavefront information as input to the adaptive optical system. This discussion is followed by a description of a specific adaptive optical configuration typical of prior-art, including an example of a wavefront-error sensing device. This, in turn, is followed by a discussion of an optical compensated imaging system typical of the art. An understanding of these prior-art systems will provide perspective with regard to the exemplary embodiments of this invention that follow.

As we discuss below, compensation of wavefront phase errors enables a system to provide diffraction-limited imaging and viewing of an extended object. In general, one first samples and compensates for propagation-path errors using, a diffraction-limited reference beam. Upon compensation of wavefront errors encountered by the reference beam, the optical system can approach its theoretical diffraction-limited imaging capability of image-bearing beams that lie within the so-called isoplanatic patch, which is well known in the art.

It is to be appreciated that the compensated optical imaging system can be implemented to service a variety of imaging based applications beyond atmospheric viewing systems. Hence, when the basic imaging system is referred to as a telescope, it is to be understood that the present teachings and embodiments can also be applied, without loss of generality, to compensated microscopy systems, speckle imaging, ophthalmological systems, communications systems, and the distortion path is referred to as a dynamic atmosphere, ultrasound imaging systems and so on. Similarly, when the distortion path that imposed the wavefront distortions to be compensated is referred to as a dynamic atmosphere, it is to be understood that the teachings can also be applied, without loss of generality, to correct for propagation-path distortions such as those experienced by imperfect optical elements, and static and/or dynamic distortions due to propagation through ocular systems, skin tissue, clouds, turbid liquids, and so on. The scene-based (Shack-Hartman) wave-front sensor could also be used in a post-processing scheme such as deconvolution or to augment speckle imaging.

Turning now to FIG. 1, the goal of the prior art system is to enable one to view an optical source 110 with diffraction-limited capability. In this case, the optical source is chosen to be of spatial extent less than, or equal to, the diffraction limit of the optical system. Therefore, this source is equivalent to a point object with zero image-bearing information, analogous to a single pixel in an image. Light that emerges from this object, which is referred heretofore as a "reference beam," 120, propagates through space, and, in general, becomes aberrated, as depicted by wavefront 120, as a result of the intervening path distortions or spatial phase errors, labeled by $\phi$. In essence, the reference beam 120 samples the propagation path distortions between it and the optical compensation system, 100, including distortions imposed by optical elements within the compensation system itself.

At the receiver end of the link, a fraction of reference beam 120 is collected by telescope 130, which represents the input optical imaging elements of the adaptive optical receiver system 100. The collected light forms an image at the camera, or detector array, 190. In the absence of path distortions, the image at the camera plane would be in the form of an Airy disc, since the reference beam 120 is a sub-diffraction-limited point-source. However, owing to optical propagation phase distortions, $\phi$, encountered by the reference beam on its path toward the receiver 110, the wavefronts of this beam will be aberrated, resulting in a distorted image of an Airy disc pattern at camera 190. As is known in the art, the path distortions in this scenario can stem from atmospheric turbulence, pointing and tracking errors, imperfect optical elements, thermal and mechanical perturbations, among other effects. The goal, therefore, of the adaptive optical system 100 is to compensate for such path errors so that the image quality of the reference beam at detector 190 can approach the diffraction limit.

Returning to FIG. 1, the reference beam exiting the telescope 130 will be aberrated by virtue of the deleterious path distortions, as represented by wavefront 140. In this example, the adaptive optical system consists of two optical correction elements. The first corrective element 150 is a so-called tip-tilt compensator, whose function is to compensate for overall beam pointing and tracking errors. The second corrective element 160 is a spatial phase modulator, whose function is to compensate for fine-scale optical phase errors, including focus errors and spatially complex wavefront errors. The latter can include static and/or dynamic errors resulting from atmospheric turbulence and surface and volume refractive-index irregularities of optical elements, as discussed above. Wavefront compensation element 160 can be in the form of arrays of continuous and/or discrete optical phase shifters, such as piezoelectric transducers, electro-optic elements, deformable membranes, MEMS mirrors, liquid crystal cells, photonic crystals, among other devices, as is known in the art.

The incident distorted beam 140, first encounters the tip-tilt optical component 150 followed by the spatial phase modulator 160. The beam subsequently strikes a beam splitter 165, with one output beam directed to an optical wavefront error sensor 170, and with the other output beam directed to the camera detector 190.

The telescope provides an image of the incident beam at the camera plane 190, and, furthermore, provides an image of the pupil plane at the surface of the wavefront corrective element 160. Hence, the wavefront at the incident aperture is replicated, and scaled, as needed, at the plane of 160. The number of phase-controllable elements across the aperture of 160 is determined, in part, by the so-called transverse coherence parameter, otherwise known as the Fried parameter, which is characteristic of the scale size of the turbulent atmosphere.

The spatial bandwidth of the phase modulator 160 is designed to accommodate the spatial bandwidth indicative of the wavefront distortions, 120, subject to Nyquist constraints, as is known in the art. The sampling of the wavefront sensor 170 is also designed to accommodate the wavefront distortions 120 subject to Nyquist comstraints. In the image compensation systems (to be discussed with respect to FIG. 2 below), the spatial bandwidth requirements for the corrective plate are the same, in terms of resolving the wavefront error distortions sampled by the reference beam. The imaging resolution, on the other hand, is dictated by the diffraction limit of the overall optical system. In most cases, the Fried parameter scale size of the turbulence is far greater than that of the pixel size required to faithfully image the object.

Each of the compensation elements 150 and 160 is controlled and configured in real-time using various classes of optical detectors, algorithms and electronic networks, examples of which are feedback, feed-forward and multi-dither systems, as is known in the art. One example of an optical feedback control loop is depicted in FIG. 1. It consists of a wavefront error sensor 170, a processor module 177, and a pair of electronic drivers 180 and 185 that provide control signals to tip-tilt compensator 150 and the spatial phase modulator 160, respectively. Ideally, the driver 185 will generate a spatial phase map indicative of a wavefront-reversed replica, whose phase is given by $-\phi$. The resultant beam will therefore possess a wavefront that is a combination of the incident phase distortion, $\phi$, with the correction phasemap, $-\phi$, resulting in a wavefront with a net phase given as $\phi+(-\phi)=0$, indicative of an aberration-free reference beam.

The optical feedback control system is designed to correct the error 140 such that the wavefront at 190 is unaberrated. This is done by driving the wavefront error seen by 170 to a minimum relative to a known reference signal that encompasses the non-common-path errors of the optical system. Upon convergence of the servo control configuration, the resultant reference beam that strikes the camera/detector 190 will be, ideally, free of wavefront errors. In this state, the overall optical receiver system 100 will provide an image of the reference beam source 110, to its diffraction limit. Given that this system functions in real-time, dynamic path distortions can be tracked and compensated, with a residual error determined by the servo-loop gain and its bandwidth.

Turning now to FIG. 2A, a compensated image adaptive optical system 200 is shown, typical of the prior art. The goal of this system is to enable precision imaging of an extended object 205 in the presence of dynamic path distortions 220, with the resultant image viewed by camera 290. The basic adaptive optical aspect of the system functions in a manner similar to that of FIG. 1. However, in the system depicted in FIG. 2A, there are now two different input beams incident upon a telescope 230. One of the two input beams is designated as a reference beam 110, and provides the same function as that of beam 110 of FIG. 1. That is, it is in the form of a sub-diffraction-limited optical source that samples the path distortions 220. The other incident light is an image-bearing beam of object 205 whose spatial information is also distorted by the path distortions 220, and whose high-fidelity compensated image is sought.

The reference and image-bearing beams both traverse the same input optical components and propagation path, including the telescope 230, intermediate focal plane 235, a collimation component, represented by lens 245, tip-tilt compensator 150, spatial phase modulator 160, imaging optics 247. The reference beam 110 and the image-bearing beam 205 both impinge upon beam splitter 265. The beam splitter directs each respective input beam into a different direction. The incident reference beam 110 emerges from one port of the beam splitter as beam 266 and propagates along one direction; and, the incident image-bearing beam 205 emerges from the other port of the beam splitter as beam 267 and propagates along a second direction. The reference beam 266 is directed to the adaptive optical control loop, and the image-bearing beam 267 is directed to a camera/detector module 290. Beam splitter 265 partitions the reference and image beams using a variety of discrimination techniques including polarization, wavelength, spatial frequency, temporal gating, as is known in the art.

In the compensated imaging system 200, the reference beam 266 exiting beam splitter 265 is directed to an adaptive optical processor in a manner analogous to that described with respect to FIG. 1. However, as opposed to FIG. 1, in the compensated imaging system of FIG. 2A, light from the incident reference beam 110 does not strike the camera 290. The sole purpose of the reference beam in this case is to provide path-distortion information to the wavefront error sensor 270 in the servo-loop so that, upon correction of the distortions imposed posed onto the reference beam, the image-bearing beam can be viewed with little or no distortion. The feedback loop, operationally, is similar to that of FIG. 1, namely, the raw wavefront-error information is inputted into processor 175 (see 277 in FIG. 2A), which, in turn provides error correcting information to drivers 180 and 185, the outputs of which provide signals to the tip-tilt compensator and the spatial phase modulator, 150 and 160, respectively.

The reference beam 266 emerging from beam splitter 265 passes through an intermediate image plane 255, followed by lens 249, which transforms the beam to a pupil plane. The beam is then scaled by the telescope (lenses 247 and 249) to satisfy the spatial bandwidth constraints of the wavefront-error sensor (WFS) 270. In this system, the WFS is a so-called Shack-Hartmann class of configuration. As is known in the art the Shack-Hartmann WFS consists of a lenslet array 271 and a detector array 273, the latter positioned at the focal plane of the lenslets. This pair of elements provides a spatial mapping of the local tilt phase errors across the overall pupil-plane aperture, that characterize the path-distorted incident reference wavefront 110. As known in the art, the required number of lenslets is a function of the square of the ratio of the input aperture size to that of the coherence (Fried) parameter indicative of the incident wavefront distortions. Under these constraints, it is assumed that the incident wavefront can be described as a series of plane-wave segments, each with a different tilt, or phase slope, and all concatenated together. Hence, each plane-wave segment is considered as a diffraction-limited beamlet, each with a different tilt angle.

FIGS. 2B and 2C, respectively, illustrate the basic prior-art principles of the Shack-Hartmann WFS, as applied to an aberrated wavefront 220, and a distortion-free wavefront 221. The WFS, identical in both FIGS. 2B and 2C, consists of a lenslet array 271 and a multi-pixel detector array 273, the latter positioned at the focal plane of the lenslets. FIG. 2B depicts the operation of the WFS assuming an input reference beam whose wavefront is aberrated. Each plane-wave segment of the input beam 222 is incident upon a different lenslet in the array 271. In the presence of no wavefront phase errors beyond the wavefront sensor's Nysquist limit, a nearly diffraction-limited sinc-squared pattern will appear at each respective focal plane. However, since each plane-wave segment is comprised of a tilted wavefront, the sinc-squared pattern at each respective focal plane at the detector array 273 win be spatially shifted, with the lateral shift increasing with the slope of the local tilt. In most systems, especially atmospheric compensation systems, the spots will not form diffraction-limited pattern due to phase errors beyond. Nyquist which distort each individual spot. A "beam's eye view" at the detector surface 273, in the presence of the aberrated bean is shown in 274. Note that the array of focused spots is does not precisely overlap the grid-pattern. This is indicative of a typical aberrated beam, whose local tilts are randomly distributed. Therefore, each spot at the plane 274 has a correspondingly different offset in the (x,y) plane relative to the grid pattern. As is known in the art, the camera or ccd array 273 will require a sufficient number and density of resolvable detector pixels to measure the offset in spot position to ascertain the local tilt error with sufficient precision.

FIG. 2C depicts the operation of the WFS assuming an input reference beam whose wavefront aberrations have been corrected. In the ideal case, the input beam 221 is a perfect plane wave, with a corresponding equi-phase surface across the entire input aperture to the WFS. As in FIG. 2B, each resolvable plane-wave segment of the input beam 223 is incident upon a different lenslet in the array 271. As before, an Airy disc pattern will appear at each respective focal plane along the detector surface 273. However, since each plane-wave segment has the same tilt (ideally, zero degrees with respect to the optical axis), each respective Airy pattern at the focal plane at the detector array 273 will be centered on its respective grid location. The "beam's eve view" at the detector surface 273, in the presence of the compensated reference beam, is shown in 274. Note that the array of focused spots precisely overlaps the grid-pattern. This is indicative of an ideal plane wave, whose local tilts are identical, and a wavefront sensor with no internal aberrations. In actual implementations, there will be internal wavefront sensor error that must be measured and removed to produce reference spot/sub-image default positions. Therefore, each spot at the plane 274 has a zero spatial offset in the (x,y) plane relative to the grid pattern. It is the goal of the servo-loop adaptive optical system to drive an aberrated beam (comprised of is finite number of tilted plane-wave segments) to a converged wavefront whose differential tilts approach zero.

It is important to emphasize that the WFS detects only the reference beam, which, by definition, does not contain image information, other than the spatial information resulting from the intervening propagation-path distortions. Hence, based on the prior art, in order to realize an image-compensation adaptive optics system, a reference beam must be present in addition to the image-bearing beam. However, in many applications, a diffraction-limited reference beam will not always be present or practical, even in cooperative scenarios (whereby, knowledge of the existence of a reference beam or of an observer is not a drawback). And, in certain cases, a reference beam optical source may be undesirable for strategic considerations, since detection of a reference optical source by a third party can reveal the presence and/or location of a covert observer. For these and other considerations, it is desirable to realize a compensated imaging system without the need for a cooperative reference beam

SUMMARY OF THE INVENTION

It is an object of the invention to provide reference-free compensated imaging methods and apparatuses to perform the methods. In a broad sense, the method makes an estimation of the Fourier phase of a series of images of a target. The Fourier magnitude of the series of images is obtained by dividing the power spectral density of the series of images by an estimate of the power spectral density of atmospheric turbulence from as series of scene based wave front sensor (SBWFS) measurements of the target. A high-resolution image of the target is recovered from the Fourier phase and the Fourier magnitude. Other objects will be apparent to those skilled in the art as a result of the teachings herein.

An embodiment of the method includes acquiring a series of images of a target and a series of scene based wave front sensor (SBWFS) measurements of the target. A Fourier phase estimation is made of the series of images of the target and a first power spectral density (first PSD) from the series of images is calculated. Slopes are calculated from the SBWFS measurements and wavefronts are estimated from the slopes. An estimation is made of the atmospheric PSD from the wave fronts to produce a second PSD. The first PSD is divided by the second PSD to produce an estimate of the Fourier magnitude of the series of images. Combining the Fourier phase and the Fourier magnitude produces a complex signal. An inverse Fourier transform is performed on the complex signal to recover a high-resolution image of the target.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 4A shows an example of an actual test image incident upon the pupil of the present invention.

FIG. 4B shows a photograph of the array of focused image-bearing beamlets using the actual test image of FIG. 4A, as seen on the surface of a Shack-Hartmann two-dimensional detector array, using the system drawn in FIG. 3B.

FIG. 4C shows a magnified portion of the object array of FIG. 4B, showing the relative sub-aperture tilt errors.

DETAILED DESCRIPTION OF THE INVENTION

Figure 1:
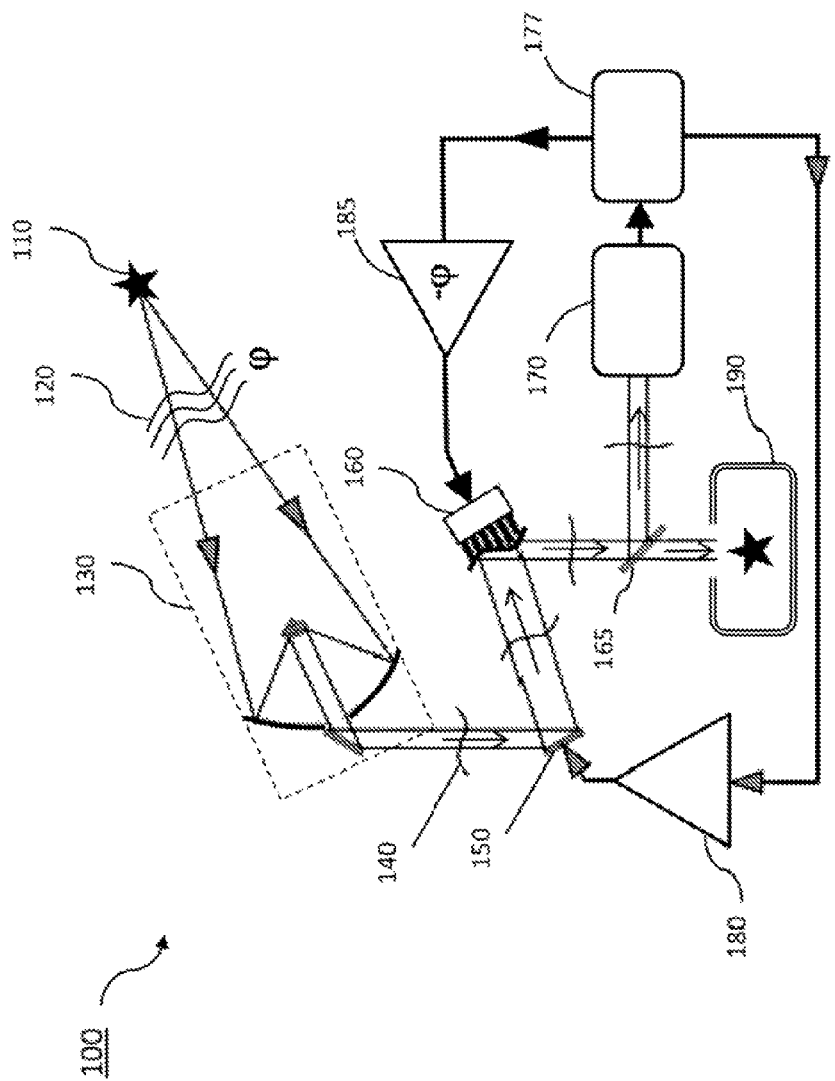
FIG. 1 depicts a typical adaptive optical system, haying the capability of compensating for dynamic wavefront distortions encountered by an optical beam upon propagation through an atmospheric path, as viewed through a telescope.
Figure 2A:
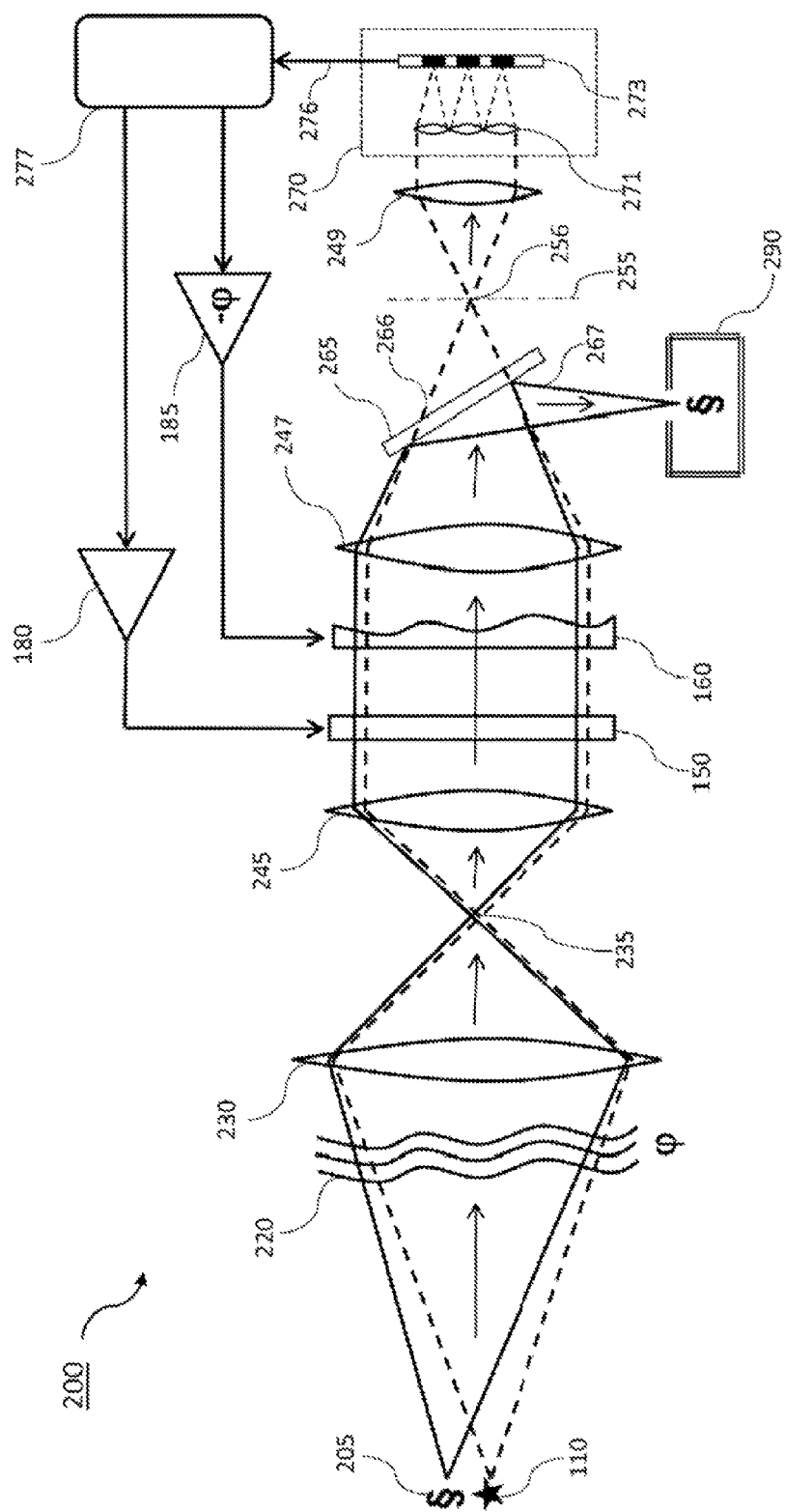
FIG. 2A depicts a typical compensated imaging system, having the capability of compensating for propagation distortions imposed onto an image-bearing optical beam, in the presence of co-propagating reference beam that samples the wavefront errors along the path. A Shack-Hartmann wavefront error sensor measures the phase aberrations encountered by the propagating beam.
Figure 2B:
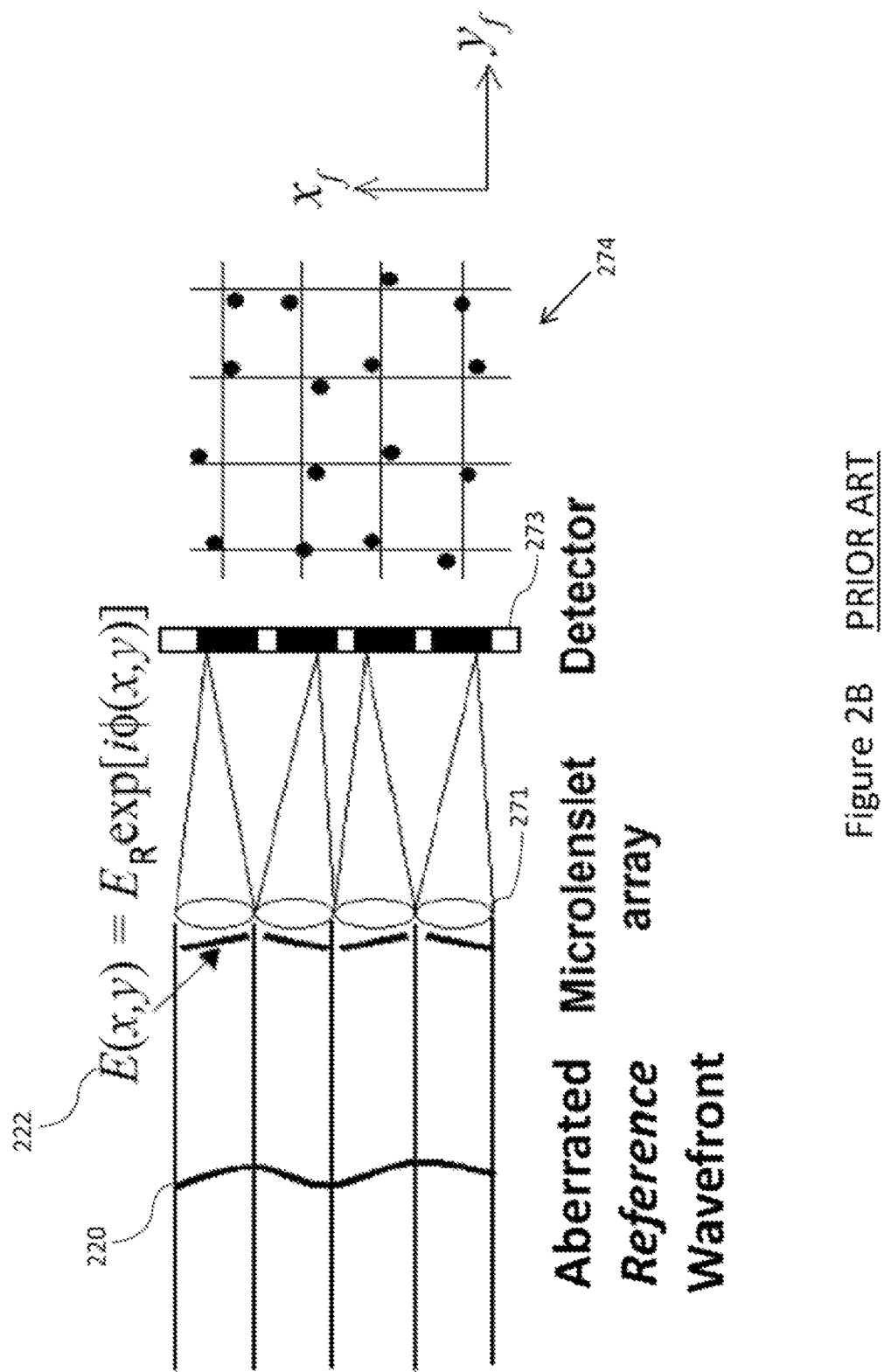
FIG. 2B depicts a Shack-Hartman wavefront-error-sensor system, for the case of an incident aberrated reference beam, showing an array of microlenses that focus the beamlets onto a detector array.
Figure 2C:
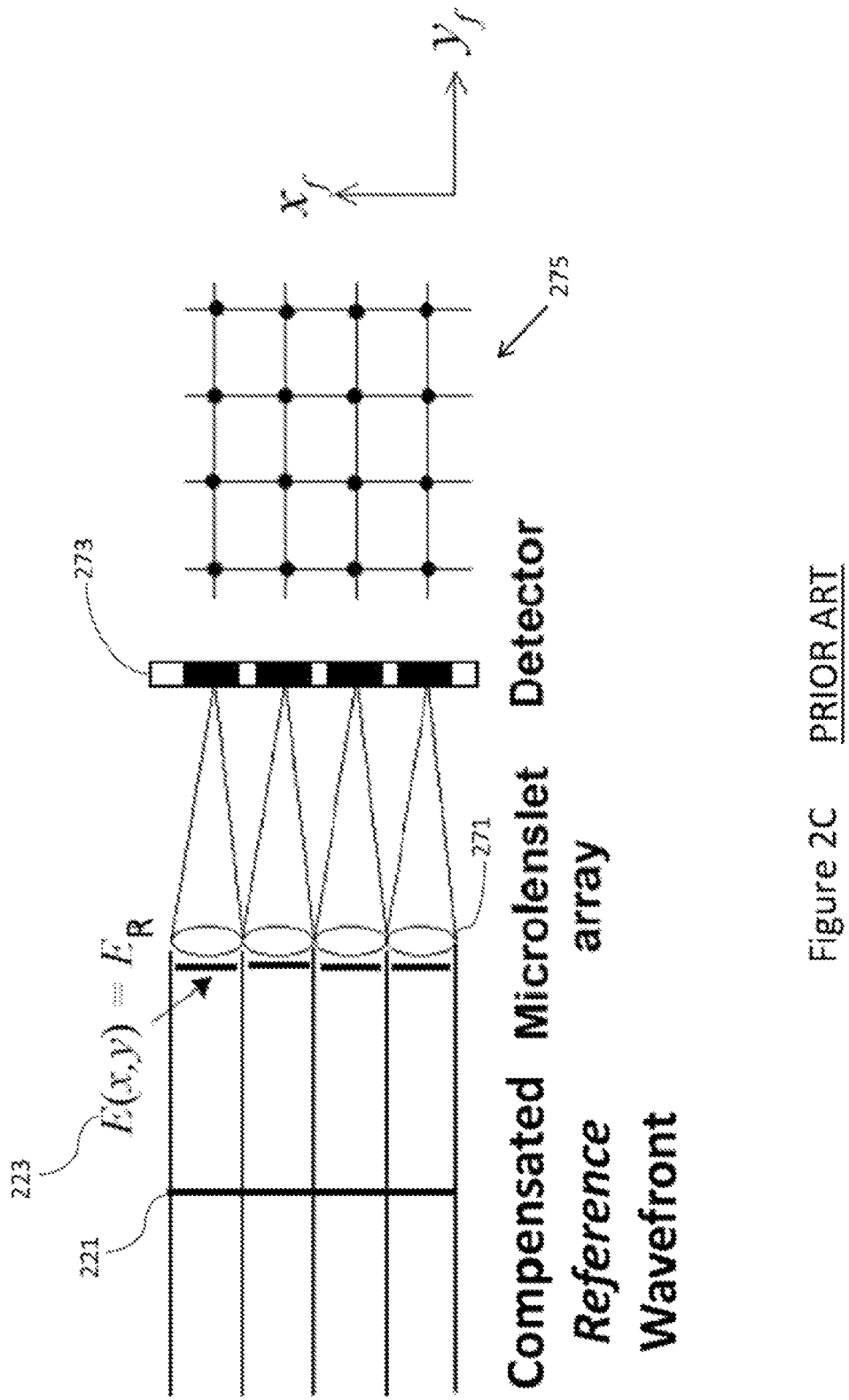
FIG. 2C depicts a Shack-Hartmann wavefront-error-sensor system, for the case of a compensated (unaberrated) reference beam, showing the beamlets focused onto a detector array.
Figure 3A:
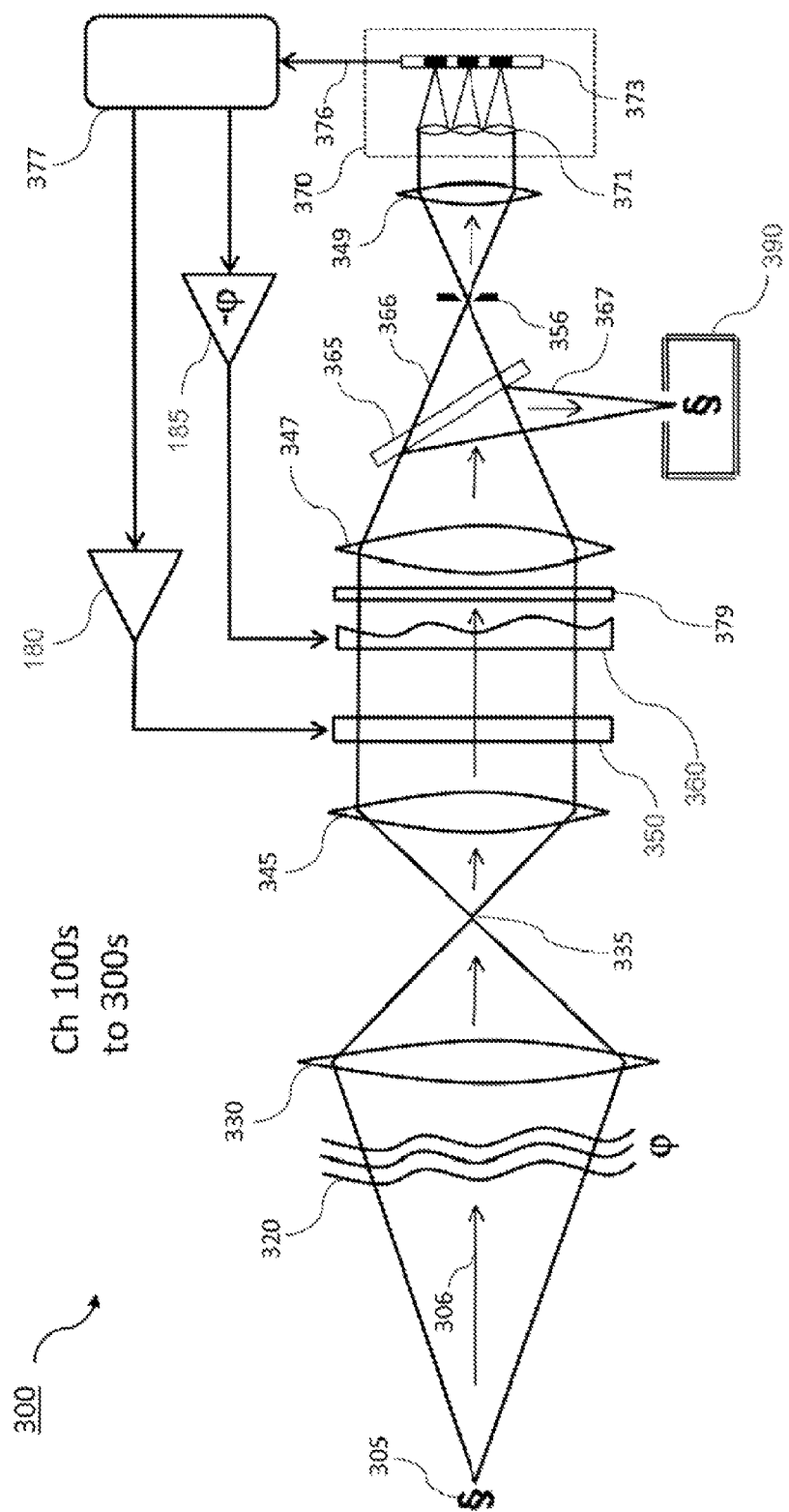
FIG. 3A shows an embodiment of the present invention depicting a compensated imaging system, using a Shack-Hartmann wavefront error sensor, haying the capability of compensating for propagation distortions imposed onto an image-bearing optical beam, without the need for a reference beam.

An exemplary embodiment of a reference-free compensated imaging system is shown in FIG. 3A. The goal of system 300 is similar to that of the prior art in FIG. 2A, namely, to enable high-quality imaging of an extended object 305, whose image-bearing beam may have experienced propagation-path distortions along an atmospheric path 320. In this embodiment, there is only a single beam that traverses the path distortions and is received by the image compensation system 300—the image-bearing beam itself, 306. That is, as opposed to the prior art, there is no independent reference beam required to sample the path distortions. In the present case, the image-bearing beam 306 essentially emulates both the image-bearing beam 205 of the prior art, as well as the reference beam 110 of the prior art (both depicted in FIG. 2A).

As depicted in FIG. 3A, the propagation-path distorted, image-bearing beam 306 is incident upon telescope 330, and subsequently, traverses intermediate focal plane 335, an optical collimator represented by lens 345, a tip-tilt compensator 350, a spatial phase modulator 360, imaging optics 347, followed by beam splitter 365. Beam splitter 365, directs the image-bearing beam into two different subsystems. One of the image-bearing beams 366 emerging from beam splitter 365 is directed to a field stop, followed by a scene-based wavefront error sensor (SB-WFS) 370. The other replica of the image-bearing beam 367 emerging from beam splitter 365 is directed to a camera detector module 390. The field stop, which prevents overlap of neighboring subimages, is comprised of transform lens 347, a fixed-diameter diaphragm, 356, and transform lens 349. The specifications of lens 349 are chosen to provide scaling of the processed pupil-plane image to match the spatial bandwidth of the SB-WFS 370. The number of resolvable elements of the SB-WFS is chosen to be consistent with the number of Fried coherence cells within the area of incident beam to telescope 330, which is a function of the atmospheric turbulence conditions along the propagation path.

In this embodiment, the SB-WFS determines the local tilt error of the beam across each subaperture, but, as opposed to performing the measurement using a reference beam (recall beam 110 in FIG. 2A), the wavefront error measurement in the present case is performed using the same image-bearing beam 306 as that of whose compensated image is sought. In this case, a correlation-based algorithm is used to determine the wavefront slope across each subaperture, which is discussed in the next section below. This algorithm is used, since the wavefront across each subaperture of the WFS consists of the atmospheric tilt imposed onto image-bearing information. Hence, in the present case, a mathematical operation is used to determine the phase slope difference between nearest neighbor atmospheric-turbulent cells, which include image information.

Returning to FIG. 3A, the adaptive optical servo-control loop of system 300 is comprised of the SB-WFS, processor 377, tip-tilt compensator 350 and spatial phase modulator 360, the latter pair of which are controlled via respective drivers 180 and 185, whose respective functions are to minimize residual tip-tilt and spatial wavefront errors. This feedback architecture is conceptually similar to that of the prior art (recall FIG. 2A). However, as noted above, the wavefront error information is now derived from measurements of the image-bearing beam, as opposed to that of the prior art, in which case, the required wavefront error information is derived from measurements of the reference beam.

In this embodiment, the SR-WFS 370 is configured as a Shack-Hartmann system, comprised of a lenslet array 371 and a multi-pixel detector 373, the latter of which can be a CCD camera detector (of other possible embodiments). Returning to the present case, a corresponding ensemble of identical images will appear at the detector plane. Since each lenslet maps a subaperture limited to a single aberration coherence patch across the pupil plane, each of the respective images will be, in general, slightly displaced, laterally, at the detector plane, indicative of the local tilt across the respective unit coherence cell. The spatial filter cutoff frequency, determined by the diameter of diaphragm 356, is chosen to enable the SB-WFS to optimally determine the wavefront slope of each respective subaperture image. A tradeoff in this configuration is the shot-noise limited performance of the CCD detector array on the one hand and the additive noise induced by the high spatial frequency components of the given image on the other hand.

Once the CCD has acquired the data, it is passed to software, which processes it and estimates the wave-front slopes. The first step in the processing is the correct identification of the locations of the sub-images formed by the SB-WFS on the CCD. Each of these sub-images has a field of view that matches diaphragm 356. An inscribed-square sub-image for adequately illuminated subaperture is extracted. These images are next sent to the slope estimation software. The slopes are estimated in two modes. To estimate the slopes across the aperture at a single instant in time, two references must be known. The first reference is the default offset location of the sub-images when there is no external aberration in the optical system. These reference slopes are determined upon initial calibration of the system. Then a specific sub-image is selected to provide the reference sub-image to which all the other sub-images are compared. The stapes can also be estimated through time for a single sub-image to enable measurement and characterization of the phase aberration through time. In this case reference slopes for all subapertures are not required, and the reference sub-image is simply the first sub-image in the series.

The algorithm that is used to calculate the sub-image shifts functions by optimally estimating the shift between two images using spatial correlation calculations with sub-pixel interpolation. This algorithm has the advantage that the accuracy and error properties of a scene can be quickly calculated a priori. To be applied to a small telescope using the SB-WFS compensated system, this algorithm has been further enhanced with added functionality. In particular, formulae were derived which enable the estimation of the gain of the scene that is used. This ensures higher-accuracy slope estimates. This gain is calculated by using a larger portion of the sub-image on the CCD extracted from the circular subfield.

Figure 3B:
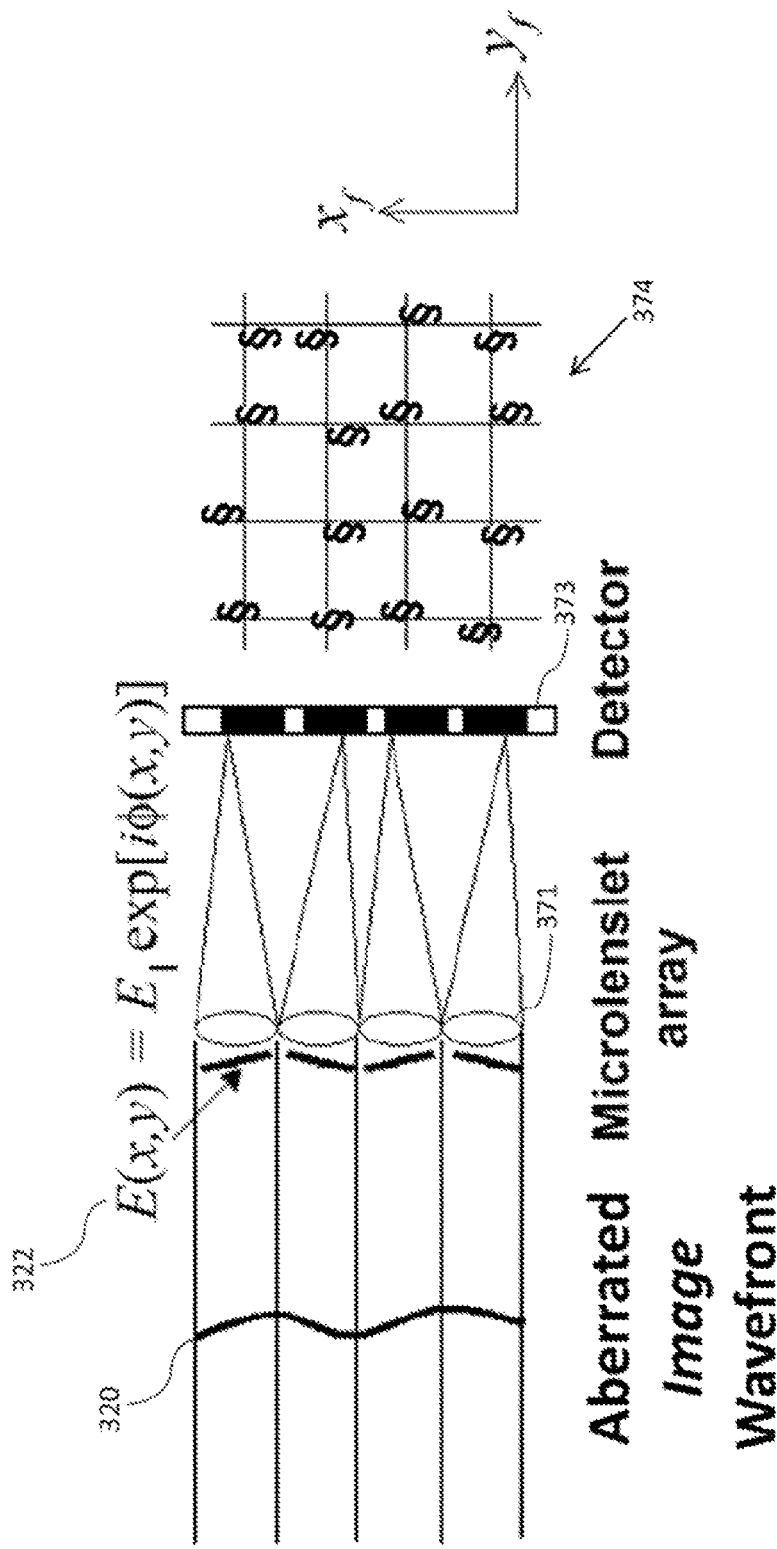
FIG. 3B depicts a Shack-Hartmann wavefront-error-sensor system used in the present invention, for the case of an aberrated image-bearing beam, showing an array of microlenses, or lenslets, that focuses the beamlets onto a detector array.
Figure 3C:
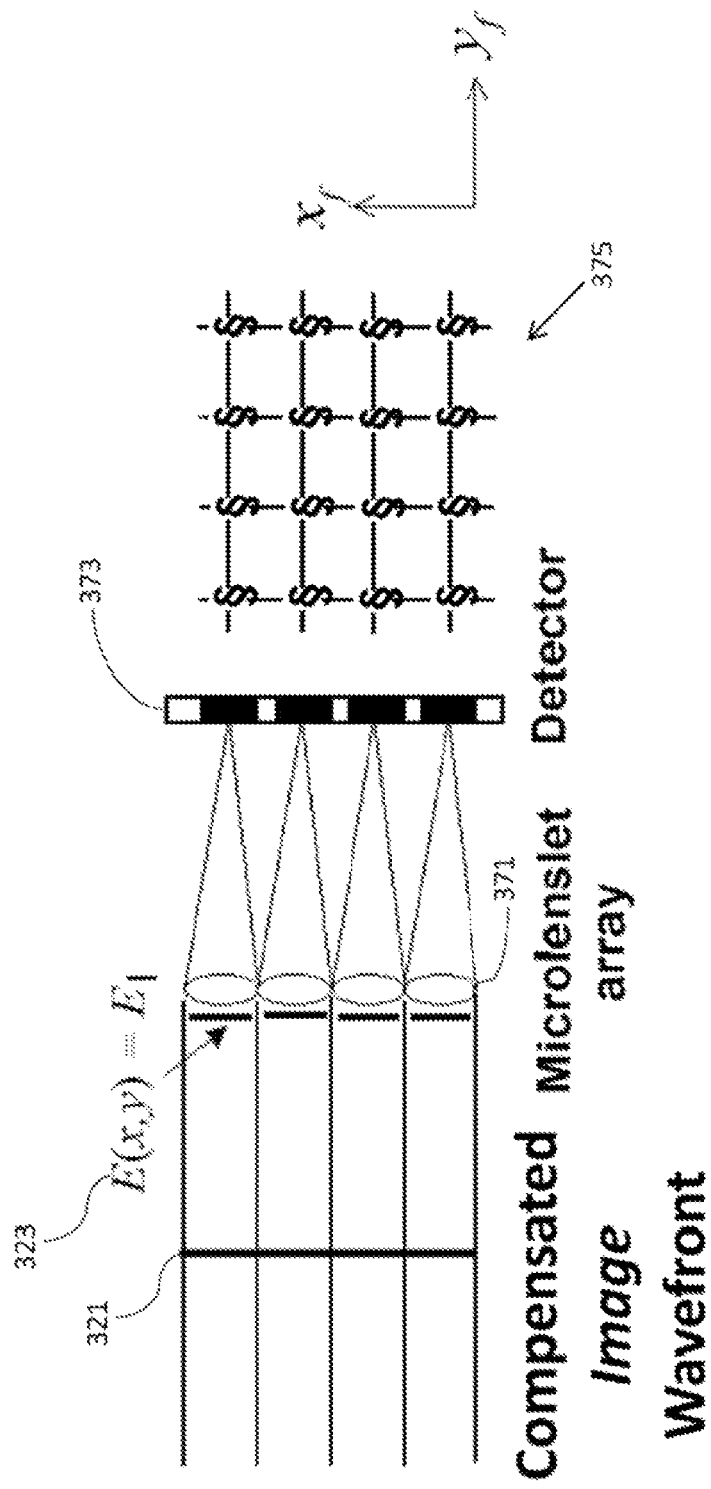
FIG. 3C depicts a Shack-Hartman wavefront-error-sensor system used in the present invention, for the case of a compensated (unaberrated) image-bearing beam, showing an array of microlenses that focuses the beamlets onto a detector array.

FIGS. 3B and 3C, respectively, illustrate the basic principle of the Scene-Based Shack-Hartmann WFS. In the present case, the incident wavefront, whose local tilts are to be determined, is the image-bearing beam itself. The respective figures depict the response of the SB-WFS in the presence of an aberrated image-bear mg wavefront 320, and a distortion-free image-bearing wavefront 321. The WFS, identical in both FIGS. 3B and 3C, consists of a lenslet array 371 and a multi-pixel detector array 373, the latter positioned at the focal plane of the lenslets. FIG. 3B depicts the operation of the SB-WFS assuming an input image-bearing beam whose wavefront is aberrated. Each tilted segment of the input beam 322 is incident upon a different lenslet in the array 371. Since each segment is a replica of the incident image 305, an image will appear at each respective focal plane, the diffraction-limit determined by the lenslet subaperture. However, since each respective segment possess an overall tilt, the respective image at the detector array 373 will be spatially shifted, with the shift increasing with the slope of the local tilt. An exemplary "beam's eve view" at the detector surface 373, in the presence of the aberrated beam, is shown in 374. Note that the array of image replicas does not precisely overlap the grid-pattern. This is indicative of a typical aberrated beam, whose local tilts are randomly distributed. Therefore, each image at the plane 374 has a correspondingly different offset in the (x,y) plane relative to the grid pattern. The number and density of resolvable pixels of detector array 373 is a function of the required precision of the tilt measurement, as limited by shot-noise considerations and additive noise, consistent with the upstream spatial filter response.

FIG. 3C depicts the operation of the SB-WFS assuming an input image-bearing beam whose wavefront aberration has been corrected. In the ideal case, the input beam 321 is an image-bearing wave, free of differential tilts across the entire input aperture to the SB-WFS. In this case, each Fried cell segment will have zero tilt, as depicted by the segmented set of tilt components, 323. As in FIG. 3B, each resolvable tilt segment of the input beam 323 is incident upon a different lenslet in the array 371. As before, an image will appear at each respective back plane along the detector surface 373. However, since each image-bearing unit cell has the same tilt (ideally, zero degrees with respect to the optical axis), each respective image replica back plane at the detector array 373 will be centered on its respective grid location. The "beam's eye view" at the detector surface 373, in the presence of the compensated image beam, is shown in 374. Note that the array of images precisely overlap the grid-pattern in the case on no internal errors in the wavefront sensor. This is indicative of an aberration-free image, whose local tilt errors have been corrected. Therefore, each image replica at the plane 374 has a zero spatial offset in the (x,y) plane relative to the grid pattern.

An example of the basic operation of a SB-WFS is shown in FIGS. 4A-C. FIG. 4A shows a photograph, taken with our experimental equipment, taken of a test pattern, which serves as an input object to a SB-WFS, with a configuration based upon the device 370 shown in FIG. 3A. Highlighted in FIG. 4A is a feature of interest 410, which is within the field of view of the SB-WFS. FIG. 4B shows a photograph taken at the detector plane of the sensor (recall FIG. 3B, 373). The beam's eye view photograph clearly shows an ensemble of nearly identical images, 420, of the desired feature of the input object, 410, as generated by the lenslet array, 373, of the SB-WFS 370. A magnified portion of the same image array is shown in the photograph in FIG. 4C, where a typical subaperture image, 430, is highlighted. As noted above, each subaperture is designed to coiled and image light from a single spatially coherent Fried cell. Hence, a local wavefront tilt error across a given subaperture would result in a slightly displaced lenslet image, 430, in a lateral direction (i.e., in the place of the photograph in FIG. 4C), relative to the other subaperture images.

Returning to the system embodiment of FIG. 3A, a typical video output signal of ccd camera 373 will appear as an array of nearly identical images (albeit laterally shifted by different amounts), typical of that photographed in FIG. 4B. The video output of the SB-WFS 370 is inputted, into the wavefront processor 377, the function of which is to computationally reconstruct the aberrated wavefront errors, as induced by the propagation path distortions 320 across the entire input aperture to the telescope 330. The output of processor 377 provides respective tip-tilt error-correction and spatial-wavefront error-correction signals to drivers 380 and 385, which, in turn controls the tip-tilt optical and spatial-phase-modulator optical corrector devices, 350 and 360, respectively. Although the optical corrector devices 350 and 360 are represented as a transmission-mode devices in FIG. 3A, it is to be understood that one or both can be configured as reflective devices. An optional narrow bandpass filter 379 is also shown in the optical path upstream of the SB-WFS and/or imaging camera 390. The function of filter 379 is to restrict the optical spectrum to be processed and imaged, in the event that out-of-band spectral components may otherwise degrade the signal-to-noise performance of the compensation system.

The above components constitute the wavefront compensation subsystem of the overall system 300. Upon convergence of this subsystem, the image-bearing beam 367 that exits the other port of beam splitter 365 will be viewable by camera 390 with minimal wavefront distortions. Note that the resolution of the compensated image at camera 390 can approach the diffraction limit of the input telescope 330 under ideal conditions.

Figure 5B:
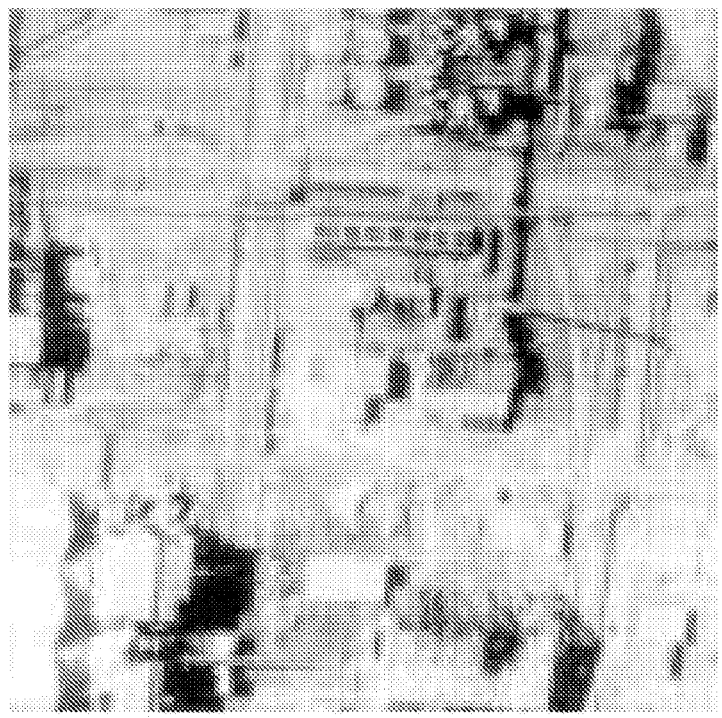
FIG. 5B shows results of a simulation of the invention, depicting the capability of the system to produce a compensated image, without the need for a co-propagating reference beam.
Figure 5A:
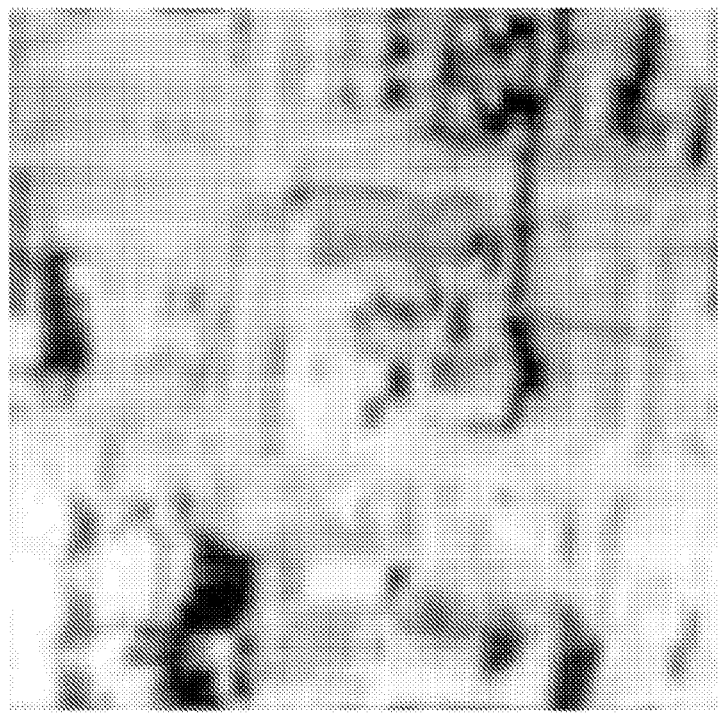
FIG. 5A shows a simulated image, with imposed propagation-path distortions, as used in a simulation of the invention.

FIGS. 5A and 5B show results of a simulation that demonstrates the ability of the system embodiment of FIG. 3A to compensate for path-distortions imposed onto a given image. The photographs in FIG. 5A and FIG. 5B were taken of a given scene from an airborne platform by a telescope similar to that depicted in FIG. 3A. The simulated image in FIG. 5A was taken through the telescope, without the compensated imaging system in operation. It is obvious that the image is distorted as a result of simulated phase distortions, typical of those imposed by a lightweight space optic. FIG. 5B shows a simulated image taken through the telescope of the same scene, but, now with the compensated imaging system in operation. This qualitative result clearly demonstrates the ability of the compensated imaging system to correct for wavefront distortions imposed onto an image using only the image-bearing beam as input to the system, without the need of an auxiliary reference beam.

Scene-based Wavefront Sensor Assisted Image Processing.

One strategy for acquiring better imagery is to take a series of images and post-process them. There are several techniques for doing this, including deconvolution and, most notably, speckle imaging. Speckle imaging requires only a series of images and an estimate of the atmospheric coherence length. This technique has been shown to be highly effective and robust to distributed atmospheric turbulence in this scenario.

Are will supplement and improve image post-processing with contemporaneous information about the wavefront aberration. This information is provided by a scene-based wavefront sensor that images the same target. This WFS information provides an estimate of the aberration that degraded the image and can improve image restoration quality.

Deconvolution

Deconvolution is a general term which describes the process of inverting (or deconvolving, hence the name) the PSF. Deconvolution comes in many flavors, but at its essence it is a non-linear optimization of an error metric which is a function of the object estimate, a series of measured images and the PSFs which created them. In our case we will consider only the deconvolution algorithm which has a fixed PSF.

Deconvolution requires an error metric to optimize. This error metric can be based on a probability distribution to find the maximum likelihood estimate of the object, e.g. assuming Poisson noise on the images. We use the more general metric which requires no knowledge of the noise distributions. The error metric is the total power in the difference between the measurements and the predicted measurements, generated with the current object estimate.

Given a set of images and corresponding PSFs, will find the estimate of the object that minimizes the total error power between the actual images and the predicted ones. In our actual system we will never have the exact PSF. The estimated PSF will be based on a noisy, sampled measurement of the wavefront phase, derived horn the WFS.

Speckle Imaging

Speckle imaging is a technique that recovers the object by separate estimation of its magnitude and phase in the Fourier domain. Speckle uses many individual images. The magnitude of the object FT is estimated using the time-averaged power spectral densities (PSDs) of the images and the aberrated PSFs. This estimate is found by division by the time-averaged PSD of the PSFs. To prevent excessive noise amplification, two modifications are made to this division. First, the parameter $r_0$ is used to weight the inverse filter. Second, the diffraction-limited OTF is imposed, which also reduces high-spatial-frequency noise.

The estimated squared-OTF $|P-(f)|2$ can be either obtained from WFS data or from a theoretical model. In the general case, the Layberie-Korff transfer function is used as the theoretical model. Instead of using this theoretical model, however, we can use a ensemble-average taken from the phase estimates obtained from the WFS. Especially when fewer frames are used or the atmospheric aberration does not conform to the Layberie-Korff model, this should provide better recovery of the object.

This Fourier magnitude information will not produce an adequate object estimate unless the phase is also recovered. This phase recovery is done independent of the atmospheric model which is used. The phase is estimated using the bispectrum method, which involves a recursive calculation and integration of the complex bispectrum from the series of images. Once the Fourier magnitude and phase are both estimated, the object estimate is obtained by a simple inverse transform.

With both deconvolution and speckle imaging of extended targets, we can use simultaneously taken wavefront measurements (with Scene-based wavefront sensing) to estimate the OTF or PSF. This information about the structure of the aberrations is used in the image processing algorithms and leads to improved image restoration.

Figure 3D:
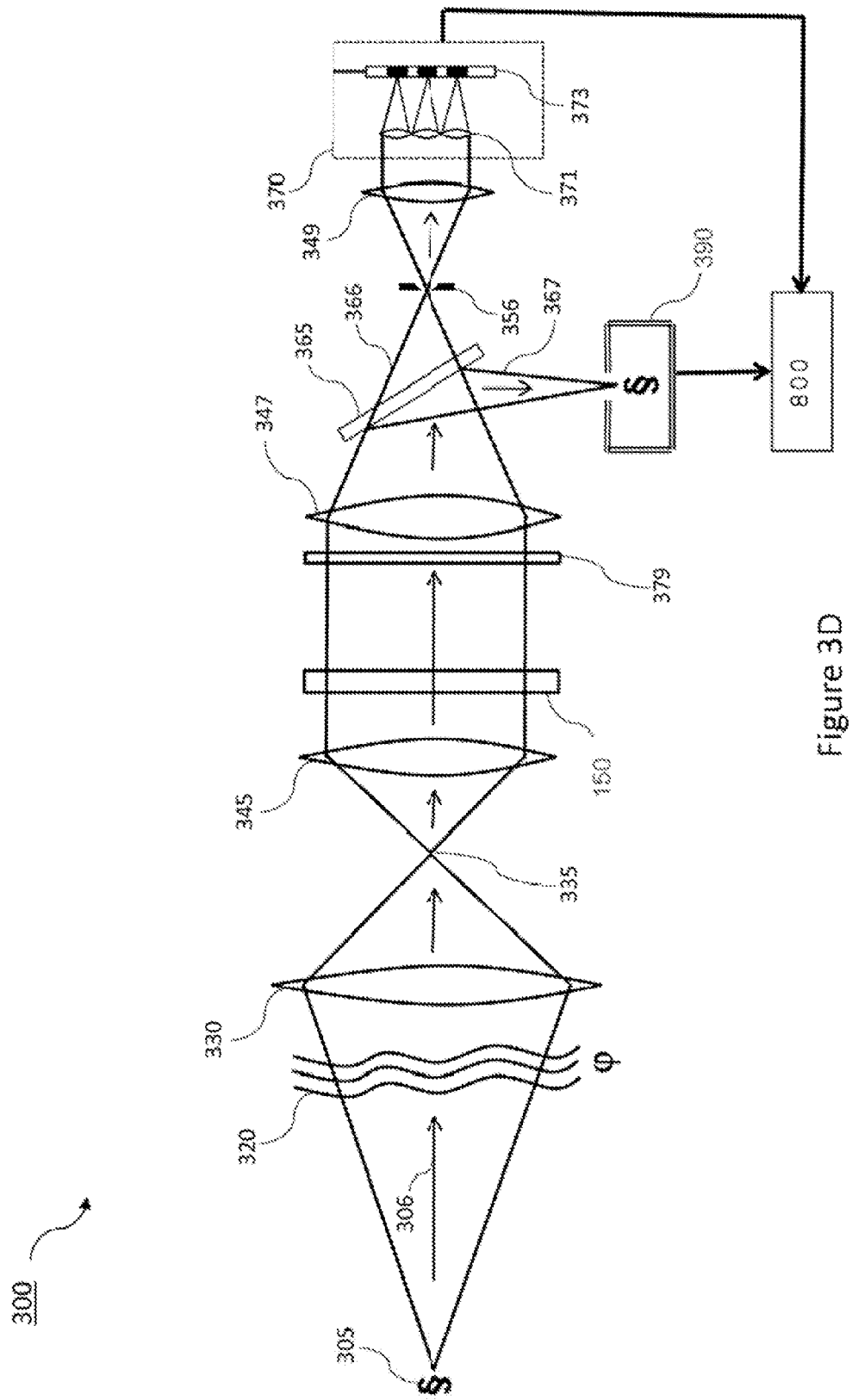
FIG. 3D shows an embodiment of the invention including a post processor.

FIG. 3D includes all of the elements of FIG. 3A, with the following exceptions. The system of FIG. 3D omits the adaptive optical servo-control loop of system 300 is comprised of the SB-WFS, processor 377, tip-tilt compensator 350 and spatial phase modulator 360, the latter pair of which are controlled via respective drivers 180 and 185, whose respective functions are to minimize residual tip-tilt and spatial wavefront errors. The system of FIG. 3D includes a post processor 800 programmed to perform the function of estimating the Fourier phase of a series of images of a target; estimating the Fourier magnitude of said series of images by dividing the power spectral density of said series of images by an estimate of the power spectral density of atmospheric turbulence from a series of scene based wave front sensor (SBWFS) measurements of said target; and recovering a high-resolution image of said target from said Fourier phase and said Fourier magnitude. An example of the programmed steps of the post processor 800 is provided in more detail in FIGS. 6A and 6B, which are discussed below.

Figure 6A:
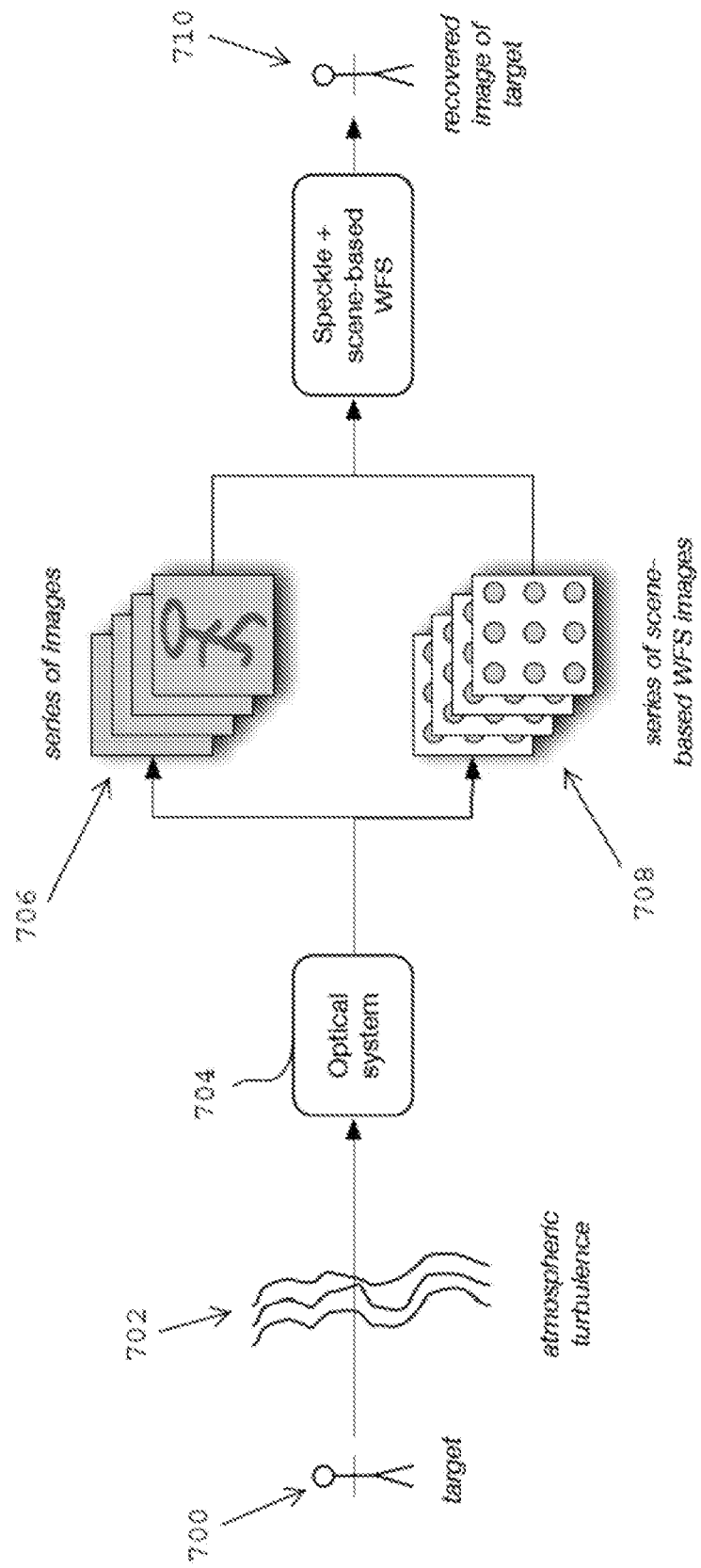
FIG. 6A shows a flow chart of an embodiment of the invention.

FIG. 6A shows a general diagram of the steps of an embodiment of the invention. The image of a target 700 encounters atmospheric turbulence 702 and is collected by an optical system 704, an example of which is shown in FIG. 3D as system 300. A series of images 706 and a series of scene-based WFS images 708 are used to produce a recovered image 710 of target 700. Accordingly, a general embodiment of the invention includes a method for recovering a high-resolution image of a target from Fourier phase and Fourier magnitude. In the method, an estimation is made of the Fourier phase of a series of images of the target. The method further includes estimating the Fourier magnitude of the series of images. In this step, the Fourier magnitude is produced by dividing the power spectral density of the series of images by an estimate of the power spectral density of atmospheric turbulence from a series of scene based wave front sensor (SBWFS) measurements of the target. The high-resolution image of the target is recovered from the Fourier phase and the Fourier magnitude.

Figure 6B:
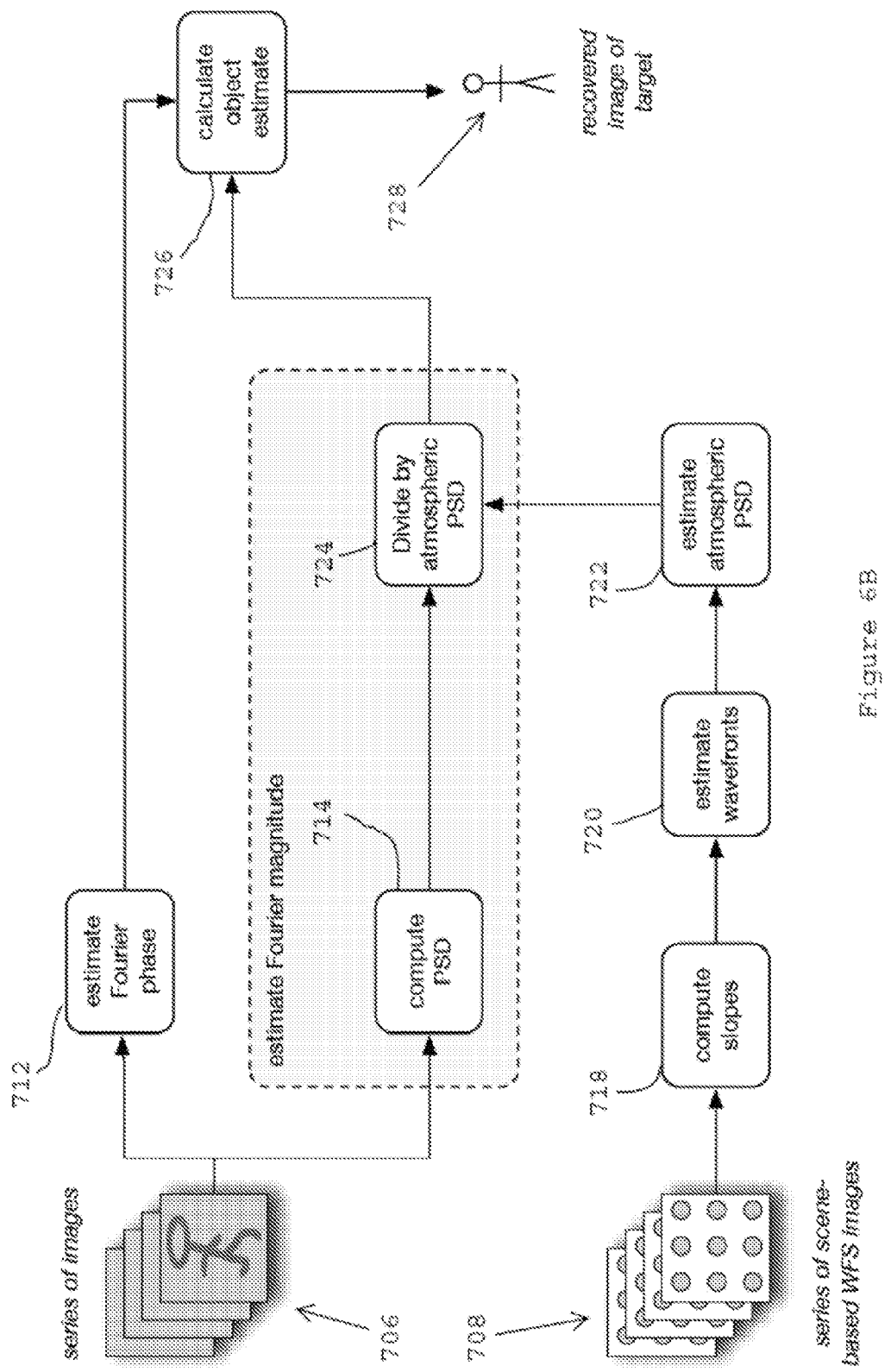
FIG. 6B shows a more detailed flow chart of aspects of FIG. 6A.

FIG. 6B shows a more detailed diagram of certain steps of the embodiment of the invention of FIG. 6A. An estimate 712 is made of the Fourier phase of the series of images 706. The power spectral density (PSD) 714 is computed from the series of images 706. A step 718 computes slopes of the series of scene-based WFS images 708. A step 720 estimates wave fronts from the slopes. Step 722 estimates atmospheric PSD from the estimated wave fronts. The computed PSD is divided by the estimated atmospheric PSD at step 724 to calculate an object estimate 726 and recover an image 728 of the target. Accordingly, an embodiment of the invention includes a method for recovering a high-resolution image of a target from Fourier phase and Fourier magnitude.

The method acquires a series of images of a target and a series of scene based wave front sensor (SBWFS) measurements of the target. The images can be acquired using an optical system such as the one shown in FIG. 3D. A estimation is made of the Fourier phase of the series of images of the target. A computation is made of a first power spectral density (first PSD) from the series of images. Slopes are calculated from the SBWFS measurements. Slopes can be calculated by maximum-likelihood estimation and correlation. See "Scene-based Shack-Hartmann wave-front sensing: analysis and simulation," APPLIED OPTICS, Vol. 42, No. 29, 10 Oct.

2003, 5807-5815, incorporated herein by reference, for a description of an algorithm usable by the present invention to calculate slopes from the SBWFS measurements. As described in the incorporated paper, based on both performance with noise and computational simplicity, periodic correlation was chosen as the preferred method. Wave fronts are estimated from the slopes. The atmospheric PSD is estimated from the wave fronts to produce a second PSD. The first PSD is divided by the second PSD to produce an estimate of the Fourier magnitude of the series of images. A complex signal is produced by combining the Fourier phase and the Fourier magnitude. A high-resolution image of the target is recovered by performing an inverse Fourier transform on the complex signal.

Figure 7B:
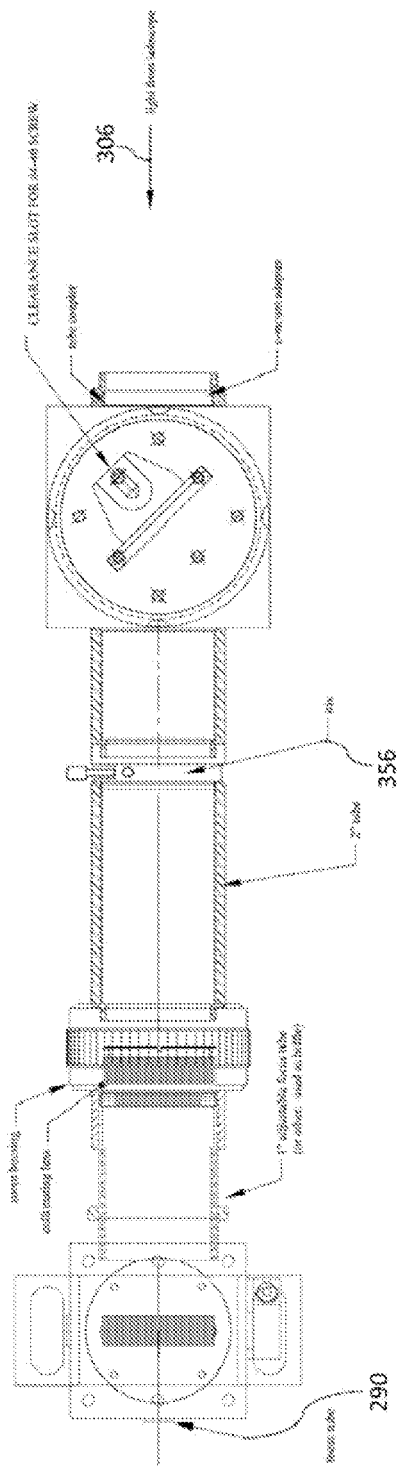
FIGS. 7A and 7B shows mechanical-drawing projections of a fieldable telescope and optical housing to mount the compensated imaging system of FIG. 3A.
Figure 7A:
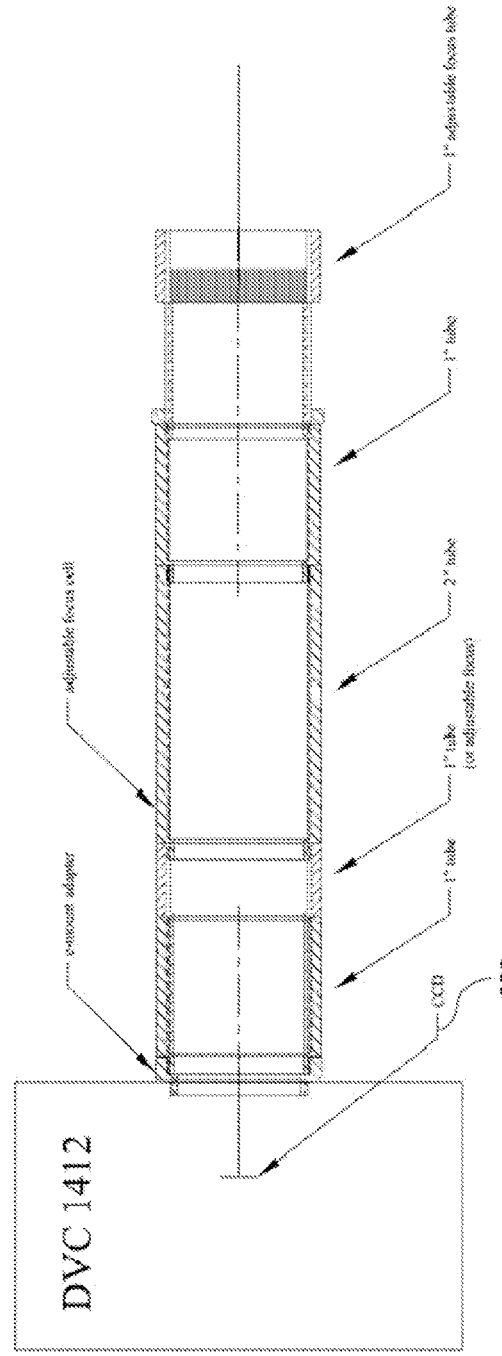

Turning now to FIGS. 7A and 7B, which show architectural views of an embodiment to house the compensated imaging system. The mechanical drawings depict key hardware components, including rugged superstructures, optical positioners and mounts, etc. Also shown are two elements of the basic embodiments of the compensated imaging system, including the fixed (or programmable) iris 356 and the CCD detector array 290. Metallic and/or composite materials can be used for the housing structure, depending on end-user requirements and constraints.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
  acquiring a series of target images by observing a target through time as the atmosphere changes and imaging said target onto a camera to produce said series of target images;
  acquiring a series of scene based wave front sensor (SBWFS) measurements by observing said target through time as the atmosphere changes and imaging said target onto a scene based wave front sensor to produce said series of SBWFS measurements;
  executing the following steps (i), (ii) and (iii) programmed on a special purpose computer:
    (i) estimating the Fourier phase of said series of target images;
    (ii) estimating the Fourier magnitude of said series of target images by dividing the power spectral density of said series of target images by an estimate of the power spectral density of atmospheric turbulence from said series of SBWFS measurements; and
    (iii) recovering a high-resolution image of said target from said Fourier phase and said Fourier magnitude; and
  displaying on a monitor said high-resolution image.

2. The method of claim 1, further comprising computing, with said special purpose computer, said power spectral density of said series of target images.

3. The method of claim 2, further comprising determining, with said special purpose computer, the estimate of the power spectral density of atmospheric turbulence.

4. The method of claim 3, wherein the step of determining the estimate of the power spectral density of atmospheric turbulence comprises:
  calculating slopes from said SMATB measurements;
  estimating wavefronts from said slopes; and
  estimating power spectral density of atmospheric turbulence from said wave fronts to produce to produce said estimate of the power spectral density of atmospheric turbulence.

5. The method of claim 4, wherein said slopes are calculated by a method selected from the group consisting of maximum-likelihood estimation, deconvolution and periodic correlation.

6. The method of claim 4, wherein said slopes are calculated by periodic correlation.

7. The method of claim 1, further comprising combining, with said special purpose computer, said Fourier phase and said Fourier magnitude to produce a complex signal, wherein the step of recovering a high-resolution image of said target from said Fourier phase and said Fourier magnitude includes recovering a high-resolution image of said target 1w performing an inverse Fourier transform on said complex signal.

8. The method of claim 1, wherein said series of scene based wave front sensor (SBWFS) measurements is produced with a Shack-Hartmann sensor array.

9. A method, comprising:
  acquiring a series of images of a target and a series of scene based wave front sensor (SBWFS) measurements of said target;
  executing the following steps (i) through (viii) on a special purpose computer:
    (i) estimating the Fourier phase of said series of images of said target;
    (ii) computing a first power spectral density (first PSD) from said series of images;
    (iii) calculating slopes from said SBWFS measurements;
    (iv) estimating wavefronts from said slopes:,
    (v) estimating atmospheric PSD from said wave fronts to produce a second PSD;
    (vi) dividing said first PSD by said second PSD to produce an estimate of the Fourier magnitude of said series of images;
    (vii) combining said Fourier phase and said Fourier magnitude to produce a complex signal; and
    (viii) recovering a high-resolution image of said target by performing an inverse Fourier transform on said complex signal; and
  displaying on a monitor said high-resolution image.

10. A non-transitory computer readable storage medium comprising executable instructions written onto said storage medium, wherein said executable instructions cause a special purpose computer to perform the following steps (i) through (viii):
  (i) estimating the Fourier phase of a series of images of a target;
  (ii) computing a first power spectral density (first PSD) from said series of images;
  (iii) calculating slopes from a series of scene based wave front sensor (SBWFS) measurements;
  (iv) estimating wavefronts from slopes;
  (v) estimating atmospheric PSD from said wave fronts to produce a second PSD;
  (vi) dividing said first PSD b said second PST) to produce an estimate of a Fourier magnitude of said series of images;
  (vii) combining said Fourier phase and said Fourier magnitude to produce a complex signal; and
  (viii) recovering a high-resolution image of said target by performing an inverse Fourier transform on said complex signal.

11. The non-transitory computer readable storage medium of claim 10, wherein said executable instructions calculate said slopes by a method selected from the group consisting of maximum-likelihood estimation, deconvolution and periodic correlation.

12. The non-transitory computer readable storage medium of claim 10, wherein said executable instructions calculate said slopes by periodic correlation.

* * * * *